US010943154B2

(12) United States Patent
Taha et al.

(10) Patent No.: US 10,943,154 B2
(45) Date of Patent: Mar. 9, 2021

(54) SYSTEMS FOR MODELING UNCERTAINTY IN MULTI-MODAL RETRIEVAL AND METHODS THEREOF

(71) Applicant: HONDA MOTOR CO., LTD., Tokyo (JP)

(72) Inventors: Ahmed Taha, Hyattsville, MD (US); Yi-Ting Chen, Sunnyvale, CA (US); Teruhisa Misu, Mountain View, CA (US); Larry Davis, Potomac, MD (US); Xitong Yang, Greenbelt, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/254,439

(22) Filed: Jan. 22, 2019

(65) Prior Publication Data

US 2020/0234086 A1 Jul. 23, 2020

(51) Int. Cl.
*G06K 9/62* (2006.01)
*G06N 3/08* (2006.01)
*G06K 9/00* (2006.01)

(52) U.S. Cl.
CPC ....... *G06K 9/6289* (2013.01); *G06K 9/00845* (2013.01); *G06K 9/6215* (2013.01); *G06K 9/6257* (2013.01); *G06K 9/6262* (2013.01); *G06N 3/08* (2013.01)

(58) Field of Classification Search
CPC .. G06K 9/6289; G06K 9/6262; G06K 9/6215; G06K 9/00845; G06K 9/6257; G06N 3/08

USPC ........................................................ 382/104
See application file for complete search history.

(56) References Cited

U.S. PATENT DOCUMENTS

2017/0293837 A1* 10/2017 Cosatto .............. G06K 9/00805
2019/0221121 A1*  7/2019 Guo ................... G06K 9/00798
2019/0332109 A1* 10/2019 Kolouri .............. G06K 9/00805

OTHER PUBLICATIONS

Arevalo, J., et al., "Gated multimodal units for information fusion", arXiv preprint arXiv:1702.01992, 2017.
Barbosa, I.B., et al., "Looking beyond appearances: Synthetic training data for deep cnns in re-identification", Computer Vision and Image Understanding, 2018.
Bishop, C.M., "Pattern recognition and machine learning", (information science and statistics) springer-verlag new york, Inc. Secaucus, NJ, USA, 2006.
Caruana, R., et al., "Multitask learning", Machine learning, 1997.
Chartsias, A., et al., "Multimodal mr synthesis via modality-invariant latent representation", IEEE transactions on medical imaging, 2018.

(Continued)

*Primary Examiner* — Juan A Torres
(74) *Attorney, Agent, or Firm* — Arent Fox LLP

(57) ABSTRACT

Multi-modal data representing driving events and corresponding actions related to the driving events can be obtained and used to train a neural network at least in part by using a triplet loss computed for the driving events as a regression loss to determine an embedding of driving event data. In some cases, using the trained neural network, a retrieval request for an input driving event and corresponding action can be processed by determining, from the neural network, one or more similar driving events or corresponding actions in the multi-modal data.

20 Claims, 6 Drawing Sheets

(56) References Cited

OTHER PUBLICATIONS

Chen, W., et al., "Beyond triplet loss: a deep quadruplet network for person re-identification", In CVPR, 2017.
Chen, X., et al., "Multi-view 3d object detection network for autonomous driving", In CVPR, 2017.
Cheng, D., et al., "Person re-identification by multi-channel parts-based cnn with improved triplet loss function", In CVPR, 2016.
Cho, H., et al., "A multi-sensor fusion system for moving object detection and tracking in urban driving environments", In Robotics and Automation (ICRA), 2014 IEEE International Conference on, 2014.
Dai, X., et al., "Temporal context network for activity localization in videos", In (ICCV), 2017.
Feng, D., et al., "Leveraging heteroscedastic aleatoric uncertainties for robust real-time lidar 3d object detection", arXiv preprint arXiv:1809.05590, 2018.
Fukui, A., et al., "Multimodal compact bilinear pooling for visual question answering and visual grounding", arXiv preprint arXiv:1606.01847, 2016.
Funahashi, K., et al., "Approximation of dynamical systems by continuous time recurrent neural networks", Neural networks, 1993.
Gal, Y., et al., "Bayesian convolutional neural networks with bernoulli approximate variational inference", arXiv preprint arXiv:1506.02158, 2015.
Gal, Y., et al., "Dropout as a bayesian approximation", arXiv preprint arXiv:1506.02157, 2015.
Gal, Y., et al., "Dropout as a bayesian approximation: Representing model uncertainty in deep learning", In ICML, 2016.
Havaei, M., et al., "Hemis:Hetero-modal image segmentation", In MICCAI, 2016.
He, K., et al., "Deep residual learning for image recognition", In CVPR, 2016.
Hermans, A., et al., "In defense of the triplet loss for person re-identification", arXiv reprint arXiv:1703.07737, 2017.
Hochreiter, S., et al., "Long short-term memory", Neural computation, 1997.
Huang, C., et al., "Learning deep representation for imbalanced classification", In CVPR, 2016.
Huang, C., et al., "Local similarity-aware deep feature embedding", In NIPS, 2016.
Huang, G., et al., "Densely connected convolutional networks", In CVPR, 2017.
Huang, P-Y., et al., "Efficient uncertainty estimation for semantic segmentation in videos", arXiv preprint arXiv:1807.11037, 2018.
Ilg, E., et al., "Uncertainty estimates and multi-hypotheses networks for optical flow", In ECCV, 2018.
Kaiser, L., et al., "One model to learn them all", arXiv preprint arXiv:1706.05137, 2017.
Kendall, A., et al., "Bayesian segnet: Model uncertainty in deep convolutional encoderdecoder architectures for scene understanding", arXiv preprint arXiv:1511.02680, 2015.
Kendall, A., et al., "Multi-task learning using uncertainty to weigh losses for scene geometry and semantics", arXiv preprint arXiv:1705.07115, 3, 2017.
Kendall, A., et al., "What uncertainties do we need in bayesian deep learning for computer vision?", In NIPS, 2017.
Kingma, D.P., et al., "Adam: A method for stochastic optimization", arXiv preprint arXiv:1412.6980, 2014.
Kokkinos, I., "Ubernet: Training a universal convolutional neural network for low-, mid-, and high-level vision using diverse datasets and limited memory", In CVPR, 2017.
Li, Y., et al., "Improving pairwise ranking for multi-label image classification", In CVPR, 2017.
Luo, W., et al., "Fast and furious: Real time end-to-end 3d detection, tracking and motion forecasting with a single convolutional net", In CVPR, 2018.
Nair, T., et al., "Exploring uncertainty measures in deep networks for multiple sclerosis lesion detection and segmentation", In MICCAI, 2018.
Ramanishka, V., et al., "Toward driving scene understanding: A dataset for learning driver behavior and causal reasoning", In CVPR, 2018.
Rasmussen, C.E., "Gaussian processes in machine learning", In Advanced lectures on machine learning. 2004.
Ristani, E., et al., "Features for multi-target multi-camera tracking and re-identification", arXiv preprint arXiv:1803.10859, 2018.
Ristani, E., et al., "Performance measures and a data set for multi-target, multicamera tracking", In ECCV, 2016.
Sankaranarayanan, S., et al., Triplet probabilistic embedding for face verification and clustering. arXiv preprint arXiv:1604.05417, 2016.
Schroff, F., et al., "Facenet: A unified embedding for face recognition and clustering", In CVPR, 2015.
Simonyan, K., et al., "Two-stream convolutional networks for action recognition in videos", In NIPS, 2014.
Srivastava, N., et al., "Dropout: a simple way to prevent neural networks from overfitting", The Journal of Machine Learning Research, 2014.
Su, C., et al., "Deep attributes driven multi-camera person re-identification", In ECCV, 2016.
Sun, Y., et al., "SVDNET for pedestrian retrieval", arXiv preprint, 2017.
Szegedy, C., et al., "Inception-v4, inception-resnet and the impact of residual connections on learning", In AAAI, 2017.
Taha, A., et al., "Two stream self-supervised learning for action recognition", Deep-Vision Computer Vision and Pattern Recognition Workshop, 2018.
Veit, A., et al., "Conditional similarity networks", In CVPR, 2017.
Yu, G., et al., "Fast action proposals for human action detection and search", In CVPR, 2015.
Zheng, L., et al., Person reidentification: Past, present and future. arXiv preprint arXiv:1610.02984, 2016.
Zheng, L., et al., "Scalable person re-identification: A benchmark", In ICCV, 2015.
Zheng, Z., et al., "Pedestrian alignment network for large-scale person re-identification", IEEE Transactions on Circuits and Systems for Video Technology, 2018.
Zheng, Z., et al., "Unlabeled samples generated by gan improve the person re-identification baseline in vitro", arXiv preprint arXiv:1701.07717, 2017.
Zhou, S., et al., "Point to set similarity based deep feature learning for person reidentification", In CVPR, 2017.

* cited by examiner

US 10,943,154 B2

SYSTEMS FOR MODELING UNCERTAINTY IN MULTI-MODAL RETRIEVAL AND METHODS THEREOF

TECHNICAL FIELD

Aspects of the present disclosure relate generally to retrieval operations in neural networks, and more particularly, to modeling uncertainty for neural network retrieval operations.

BACKGROUND

Quantifying uncertainty is gaining momentum in real-world vision applications. The network uncertainty in its output decision can be informative when building decisions based on a neural network. For example, uncertainty in object identification based on measured loss can be used in building decisions based on the object identification. Uncertainty can also be used to improve the network training and quantitatively boost performance during inference operations. These approaches can be adapted in regression and classification contexts. Real-world vision applications can include those employed in complicated driving contexts where objects can be identified and human vision systems can aid in perceiving and interacting with the identified objects. This can further enhance autonomous driving scenarios. In such systems, driver attention can be modeled as a dataset including identified events and corresponding determined driver action. Based on identifying events by the real-world vision applications, an autonomous vehicle can be controlled to perform the determined driver action. Further improvements in event identification and/or associating such with other data can be desired to model driver behavior for more appropriate autonomous vehicle decisions.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method for performing retrieval operations in neural networks is provided. The method includes obtaining multi-modal data representing driving events and corresponding actions related to the driving events, training a neural network based on the multi-modal data at least in part by using a triplet loss computed for the driving events as a regression loss to determine an embedding of driving event data, processing a retrieval request for an input driving event and corresponding action by determining, from the neural network, one or more similar driving events or corresponding actions in the multi-modal data, and indicating, in response to the retrieval request, at least a subset of the one or more similar driving events or corresponding actions.

In another example, a computing device for performing retrieval operations in neural networks is provided that includes a memory, and at least one processor coupled to the memory. The at least one processor is configured to obtain multi-modal data representing driving events and corresponding actions related to the driving events, train a neural network based on the multi-modal data at least in part by using a triplet loss computed for the driving events as a regression loss to determine an embedding of driving event data, process a retrieval request for an input driving event and corresponding action by determining, from the neural network, one or more similar driving events or corresponding actions in the multi-modal data, and indicate, in response to the retrieval request, at least a subset of the one or more similar driving events or corresponding actions.

In another example, a non-transitory computer-readable medium storing computer executable code for performing retrieval operations in neural networks is provided. The code includes code for obtaining multi-modal data representing driving events and corresponding actions related to the driving events, training a neural network based on the multi-modal data at least in part by using a triplet loss computed for the driving events as a regression loss to determine an embedding of driving event data, processing a retrieval request for an input driving event and corresponding action by determining, from the neural network, one or more similar driving events or corresponding actions in the multi-modal data, and indicating, in response to the retrieval request, at least a subset of the one or more similar driving events or corresponding actions.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
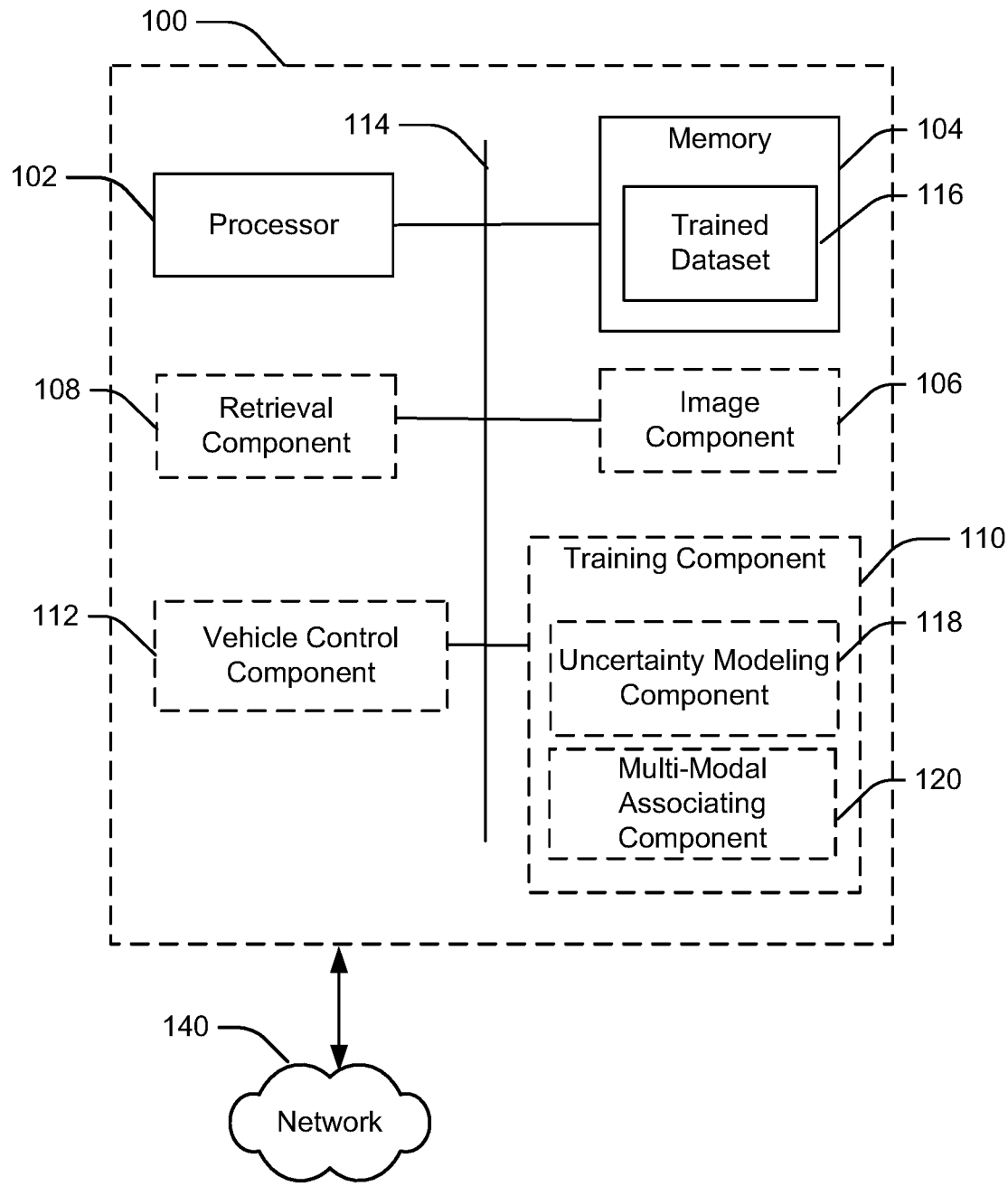
FIG. 1 illustrates a schematic view of an example of a system for object retrieval from a neural network according to one aspect of the disclosure.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known components are shown in block diagram form in order to avoid obscuring such concepts.

The term "dropout," as used herein, can refer to data used in training a neural network that is dropped from consideration in the dataset, and/or associated metrics thereof. In examples, dropout can be used to determine loss associated with training the neural network with respect to a certain class of data. In a specific example, dropout can refer to neural network connections that are analyzed and dropped from consideration in training the dataset.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

The term "triplet loss," as used herein, can refer to a loss function used when training a neural network. In training the neural network based on a dataset, for example, an associated training sample is composed of a triplet of data including an anchor data, a, a positive data, p, that is of the same class as the anchor, and a negative data, n, that is of a different class than the anchor. The triplet loss can be computed as a distance between a and p minus a distance between a and n. In other examples, the triplet loss can also include adding a margin to the distance difference and/or can be a non-negative integer such that computed triplet loss less than zero can be set to zero. In one example, using the variables above and were d is a distance function, triplet loss L=max(N a, O−N a, M+L aggiM, 0).

Described herein are aspects related to modeling uncertainty for neural network retrieval operations. In an example, in training a neural network for retrieval operations, a triplet loss associated with training data can be used as a regression loss to model uncertainty. For example, in training a neural network for identifying similar data (e.g., image or video data), a triplet loss associated with data used in training can be used as a regression loss for modeling uncertainty. In an example, the triplet loss can be projected as the regression loss to enable epistemic uncertainty evaluation using dropout as a Bayesian approximation framework. In a specific example, a Monte Carlo (MC) sampling can be performed based on the triplet loss, as the regression loss, to model the uncertainty for given data. The sampling can provide an embedding for the data, which can be useful in retrieval operations using the neural network.

In one example, a multi-modal conditional retrieval neural network can be trained for identifying events or corresponding stimulus, and/or an associated action performed based on the event. For example, a multi-modal conditional retrieval neural network can include a dataset obtained from multiple modalities in terms of images and/or video and sensor control. One example of a multi-modal conditional retrieval neural network can provide driver behavior and causal reasoning in terms of actions and events. The events can correspond to identifying aspects of the images and/or video that may indicate a certain event, and/or associated properties thereof, such as movement of objects over multiple image frames. The actions can correspond to sensed driver activity, such as braking, accelerating, steering, etc. The actions and events can be temporally fused to associate the actions with the events (e.g., as driver actions taken for a purpose or goal and/or when presented with a stimulus). Modeling uncertainty computed based on triplet loss, as described above, in identifying actions and/or corresponding events can be used to determine an embedding for the data.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example of a system 100 for modeling uncertainty associated with training a neural network in accordance with aspects described herein. Components of the system 100, as well as the components of other systems, hardware architectures and software architectures discussed herein, can be combined, omitted or organized into different architectures for various aspects of the disclosure. However, the example aspects and configurations discussed herein focus on the system 100 as illustrated in FIG. 1, with corresponding system components and related methods.

As shown in FIG. 1, system 100 can include or be operably coupled with (or executed by) one or more processors 102 and one or more memories 104 that communicate to effectuate certain actions described herein. For example, the one or more processors 102 and/or one or more memories 104 can execute, and/or store instructions, parameters, etc., for executing one or more components, which can include one or more optional components such as an image component 106 for obtaining an image of a dynamic scene, a retrieval component 108 for retrieving trained neural network data related to one or more aspects of the image, a training component 110 for training a neural network to facilitate retrieval of the one or more aspects, and/or a vehicle control component 112 for controlling a vehicle (e.g., one or more systems of the vehicle, an autonomous-driving vehicle, etc.), which can be based on the retrieval. The processor(s) 102, memory(ies) 104, various ones of the components 106, 108, 110, 112, etc. can be operatively coupled via a bus 114. In another example, processor(s) 102 can execute one or more of the various components 106, 108, 110, 112 to perform functions described herein, while being operatively coupled to the memory(ies) 104 and/or other components via the bus 114. In an example, the components 106, 108, 110, 112 are shown as optional and can be implemented within different systems or the same system. For example, training component 110 can train a neural network on one system that provides a trained dataset to another system that executes the retrieval component 108, which can be a different system from that which executes the vehicle control component 112 to control a vehicle, etc. Thus, systems described in accordance with aspects herein may or may not include all of the components 106, 108, 110, 112 in a single system. In an example, system 100 and/or one or more components thereof, may communicate with a network 140 in accordance with various aspects described herein.

In an example, image component 106 can capture an image and/or video of a dynamic scene during operation of a vehicle. Memory 104 can include a trained dataset 116 to facilitate retrieving data associated with the image. The trained dataset 116 can be output from neural network training based on an input data set, and can include associations among detectable aspects (e.g., events) associated with an image. In this example, retrieval component 108 can identify one or more events of the image based on querying the trained dataset 116, and can verify associated data. In a specific example, the trained dataset 116 can include one or more events for identifying in an image, along with associated actions taken based on the one or more events. In an example, the events and/or actions can exist as labels in the data or as more complex data. In this example, retrieval component 108 can determine whether one or more of the events exist in the image, which can include comparing portions of the image with images in the trained dataset 116. In addition, retrieval component 108 can determine and verify an action associated with the image based on actions associated with images of the event in the trained dataset 116.

For example, training component 110 can be used to train a neural network and output trained dataset 116. Training component 110 can optionally include an uncertainty modeling component 118 for modeling uncertainty associated with training data in the trained dataset 116 by using a triplet loss computed for the driving events as a regression loss to determine an embedding of the data, such as training data in the form of an event identified in an image. Training component 110 can also optionally include a multi-modal associating component 120 for associating or embedding data from multiple modal inputs in a common space, such as event data and corresponding action data, as described further herein.

Figure 2:
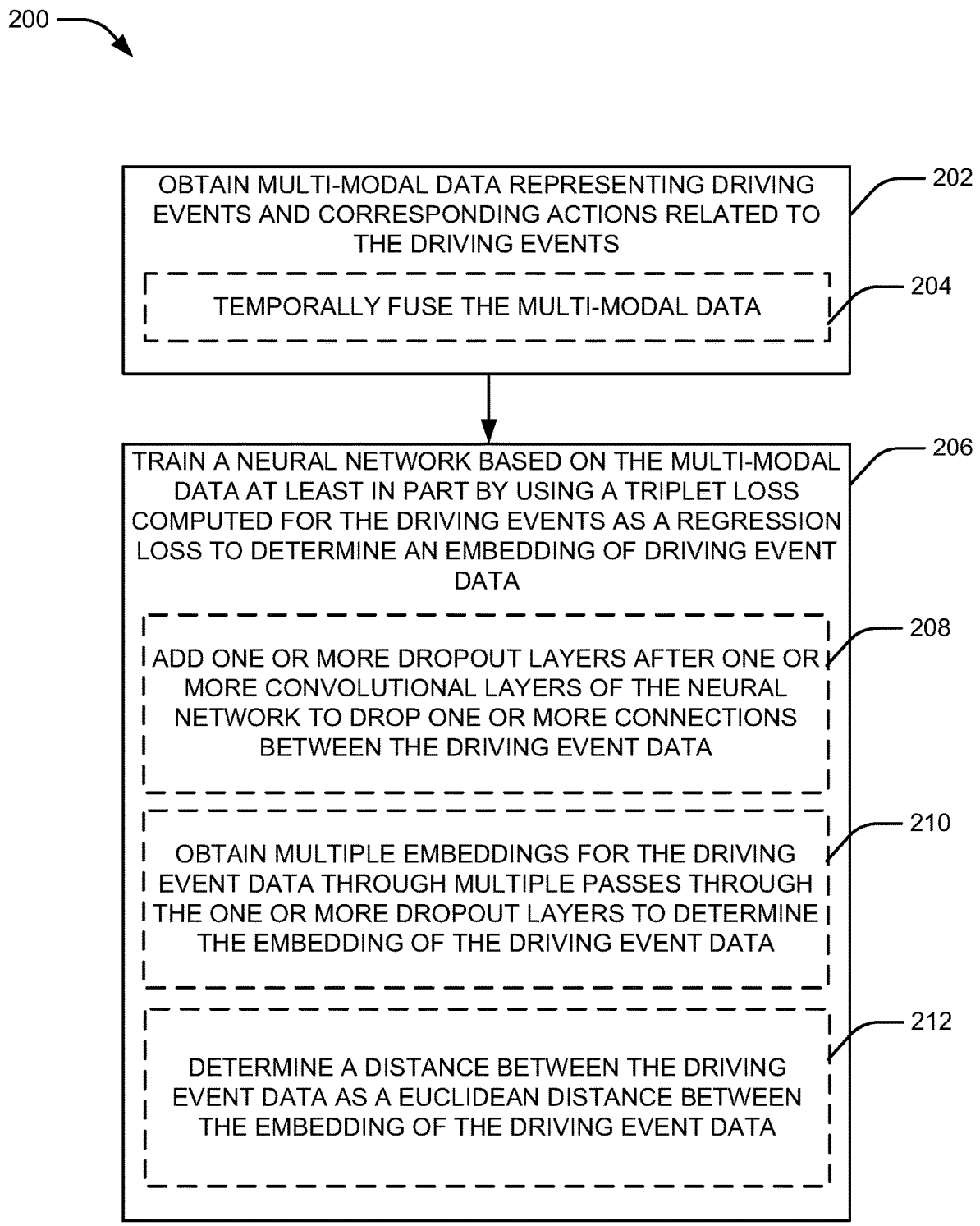
FIG. 2 illustrates a flowchart showing an example of a method for modeling uncertainty in a neural network according to one aspect of the disclosure.

Referring now to FIG. 2, which is described in conjunction with the example system 100 of FIG. 1, an example method 200 for training a neural network is illustrated. For example, method 200 can be performed by one or more processors 102 and/or memories 104 of a system 100, which can be a single computing device, distributed across multiple computing devices, etc. In this regard, one or more blocks can be performed (e.g., in full or in part) on a given computing device, on a device at a remote location (e.g., such that results can be shared with the given computing device), etc.

In block 202, the method 200 can include obtaining multi-modal data representing driving events and corresponding actions related to the driving events. In an aspect, training component 110, e.g., in conjunction with processor 102, memory 104, etc., can obtain the multi-modal data representing the driving events and corresponding actions related to the driving events. For example, training component 110 can obtain the data from a data source of the desired multi-modal data and/or from an image component 106 (e.g., an image sensor, such as a camera) and vehicle control component 112 (e.g., one or more sensors to sense driving activity) on one or more vehicles. For example, images from the image component 106 can be temporally associated, as events, with actions from the one or more other sensors. In this regard, in a specific example, the events can be temporally associated, in a multi-modal dataset, with one or more actions represented by sensor activity. In an example, the driving events may include goal-oriented events, such as making a right turn or a left turn, and/or stimulus-driven events, such as stopping for a traffic light or for pedestrians on the sidewalk, etc.

In one example, in obtaining the multi-modal data at block 202, method 200 can optionally include temporally fusing the multi-modal data. In an aspect, multi-modal associating component 120, e.g., in conjunction with processor 102, memory 104, training component 110, etc., can temporally fuse the multi-modal data (e.g., event detection and corresponding driver action data). For example, given multiple sets of data, multi-modal associating component 120 can use one or more of multiple possible fusion implementations to fuse the data. For example, Kiela et al., in "Efficient large-scale multi-modal classification," in arXiv preprint arXiv:1802.02892, 2018, which is incorporated by reference herein, examine multimodal text classification where one modality is a discrete text and the other is a continuous visual representations transferred from a pre-trained convolutional neural network (CNN). In the medical domain, multi-modal, or hetero-modal, fusion can benefit manifest in image segmentation application, where robustness is essential when missing modalities during testing. For example, except for concatenation, fusion methods promote common embedding space across heterogeneous modalities. This space enables arithmetic operations between individual embedding; thus allow missing modalities at inference time. For a multi-modal system with (M1, M2, . . . ; Mk), multi-modal associating component 120 can use multiple possible fusion approaches, such as element-wise addition fusion. Similar to addition, as described by Havaei et al. in "Hemis:Hetero-modal image segmentation," in International Conference on Medical Image Computing and Computer-Assisted Intervention, pages 469-477. Springer, 2016, which is incorporated by reference herein, first and second moments, mean and variance, can be concatenated across modalities. This fusion variant is robust to any combinatorial subset of available modalities provided as input, without the need to learn a combinatorial number of imputation models. Other fusion derivatives can include gated fusion, as described by Arevalo et al. in "Gated multimodal units for information fusion," in arXiv preprint arXiv:1702.01992, 2017, which is incorporated by reference herein, maximum fusion, as described by Chartsias et al. in "Multimodal mr synthesis via modality-invariant latent representation," in IEEE transactions on medical imaging, 37(3):803-814, 2018, which is incorporated by reference herein, and bilinear fusion, as described by Fukui et al. in "Multimodal compact bilinear pooling for visual question answering and visual grounding," in arXiv preprint arXiv:1606.01847, 2016, which is incorporated by reference herein, which can be used in integrating natural language and visual modalities.

Using a single embedding space for multi-modal fusion can enable arithmetic operations between different embedding and can promote robustness to missing modalities, as described by Havaei et al., cited above. Yet, a single space embedding can pose limitations for capturing multiple similarity labels. Veit et al., in "Conditional similarity networks," in CVPR, volume 1, page 4, 2017, which is incorporated by reference herein, propose a conditional similarity network (CSN) that can balance the single embedding space merits and multiple similarity labels functionality. The CSN can learn a single embedding space then disentangle separate representation for each similarity label and can eliminate a requirement to train individual specialized networks for each similarity label while promoting shared representation learning. In an example, multi-modal associating component 120 can generate and leverage learnable masks to disentangle different similarity labels, which can reduce the system complexity by training a single network. This can also boost performance, which can be attributed to the joint formulation and shared representation learning.

As described, the identified stimulus or event can be associated with a corresponding action in a multi-modal neural network that temporally correlates detected stimuli with corresponding actions. For example, the stimuli can be detected based on detecting movement or existence of certain objects in image frames over different periods of time, and the corresponding actions can be detected by determining input from one or more sensors (e.g., controller area network (CAN) sensors) at the different periods of time during which the stimuli are detected. In the multi-modal network, for example, each modality can be independently encoded and then fused into a common space using averaging (e.g., mean fusion), and a set of trainable masks can be learned to enable conditional retrieval dependent on similarity labels.

In block 206, the method 200 can include training a neural network based on the multi-modal data at least in part by using a triplet loss computed for the driving events as a regression loss to determine an embedding of driving event data. In an aspect, training component 110, e.g., in conjunction with processor 102, memory 104, etc., can train the neural network based on the multi-modal data at least in part by using the triplet loss computed for the driving events as the regression loss to determine the embedding of driving event data (e.g., in the trained dataset 116). For example, training component 110 can train the neural network based on a variety of input data to generate trained dataset 116. In an example, training component 110 can obtain input data in the form of objects for identification, where the data can include images of the objects and associated object labels. In one example, training component 110 can train the neural network with multiple images to facilitate detecting events represented by the images based on association with one or more of the images. Training component 110, for example, can determine events with which the multiple images are likely associated (e.g., based on comparing aspects of the images), and can identify an association between the images based on identifying similar properties of the images. In one example, the training component 110 can label the events in the image to improve retrieval performance.

In an example, triplet loss associated with the one or more images of events can be determined. In one example, training component 110 can train the neural network to determine image triplets of an anchor image, a positive image (e.g., another image of the event), and a negative image (e.g., an image of a different event), and to compute the triplet loss for each image triplet. The triplet loss can provide a measurement of loss with respect to identifying the anchor image as representing an event based on a distance (e.g., Euclidean distance) from the positive image and a distance from the negative image, as described. In one example, the triplet loss can be stored in the trained dataset 116 with each triplet and/or with a given anchor image, or can be otherwise separately stored.

In training the neural network at block 206, the method 200 can optionally include, at block 208, adding one or more dropout layers after one or more convolutional layers of the neural network to drop one or more connections between the driving event data. In an aspect, training component 110, e.g., in conjunction with processor 102, memory 104, etc., can add the one or more dropout layers after the one or more convolutional layers of the neural network to drop the one or more connections between the driving event data (e.g., in the trained dataset 116). In an example, the one or more dropout layers can drop neural network connections between driving event data when training the network based on using the triplet loss as a regression loss. In an example, given a supervised task with an input X and ground truth output Y, the Gaussian process (GP), as described by Rasmussen in "Gaussian processes in machine learning," in Advanced lectures on machine learning, pages 63-71. Springer, 2004, which is incorporated herein by reference, allows modeling the distributions over functions that generate the data. This can enable model uncertainty with Monte-Carlo (MC) sampling, as described further herein.

To model the function distributions, a Bayesian approach can be followed. Starting with some prior distribution over the space of functions $p(f)$, the posterior distribution can be determined over the space of functions:

$$p(f|X,M) \propto P(Y|X,f)P(f)$$

In this example, $p(f|X, Y)$ evaluation can include choosing a covariance function $K(X1, X2)$, a function that defines similarity (e.g., scalar similarity) between each pair of input points $K(x_i, x_j)$. This can include an inversion of an N×N matrix, an operation that can be of O(N3) time complexity. Variational inference can be an approximation approach with manageable time complexity. By conditioning the model on random variables W instead of $f$ (e.g., use P(W|X, Y) instead of P($f$|X, Y)), a more predictive distribution for a new input point x* can be given by:

$$P(y^*|x^*,X,Y)=\int P(y^*|x^*,w)P(w|X,Y)dw$$

where W can act as weight of a neural network function. P(y*|x*,X,Y) may not be evaluated analytically, but an approximation using variational distribution q(w) can be possible, which can lead to a Kullback-Leibler (KL) divergence minimization:

$$KL(q(w)|p(w|X,Y))$$

Minimizing the Kullback-Leibler divergence can be similar to maximizing the log evidence lower bound (ELBO):

$$vi=\int q(w)\log P(Y|X,w)dw - KL(q(w)\|p(w))$$

Gal et al., in "Dropout as a Bayesian approximation: Representing model uncertainty in deep learning," in international conference on machine learning, pages 1050-1059, 2016, which is incorporated herein by reference, show that the ELBO objective function is equivalent to optimizing a regression neural network:

$$L_{reg} = -\frac{1}{2N}\sum_{n=1}^{N}\|y_n - \hat{y}_n\|_2^2 - \lambda\|M\|_2^2$$

where $\lambda$ is a weight regularization hyper-parameter, the random variable realization W can be approximated as W=zM where z~Bernoulli(P), e.g., a dropout is used before each training layer. Flipping the −ve sign for reg can yield standard minimization objectives. This can also enable MC sampling from dropout network outputs to approximate the posterior P (Y|X, W) for a regression function. Thus, as described further herein, the triplet loss can be cast as a regression loss to allow MC sampling in the retrieval context. In addition, though triplet loss is described and used herein, the described concepts can be similarly applied to quadruplet loss, quintuplet loss, etc., based on more positive or negative images.

In one example, triplet loss can be used in training the neural network for facial recognition and/or person re-identification. In other examples, the triplet loss can be used in training the neural network for object and/or stimulus detection in a multi-modal neural network, as described herein. In either case, using the triplet loss to compute the uncertainty metric can provide more reliable results in subsequent retrieval of data from the trained dataset 116. For example, giving a training dataset including N triplets $\{(x_1, y_1, z_1), (x_2, y_2, z_2)\}$ And corresponding distance outputs $d_1, d_2, \ldots, d_n$, the triplet loss can be reformulated as a trivariate regression function, e.g., as:

$$f_{tri}((x_i,y_i,z_i)=d_i\in[0,2]=[D(\lfloor x_i\rfloor-\lfloor y_i\rfloor)-D(\lfloor x_i\rfloor-\lfloor z_i\rfloor)+m]_+$$

where $[.]_+=\max+(0,.)$, m is margin between different classes embedding, and $\lfloor.\rfloor$ is a unit-length embedding function. $f_{tri}((x_i, y_i, z_i)$ can output $d_i=0$ if $y_i$, $x_i\in c_i$ and $z_i\in c_j$ and can output $d_i=2$ if $z_i$, $x_i\in c_i$ and $y_i\in c_j$ s.t. i≠j. In an example, uncertainty modeling component 118 can use this trivariate regression function as input to MC sampling to determine the uncertainty metric for a given triplet.

In training the neural network at block 206, the method 200 can optionally include, at block 210, obtaining multiple embeddings for the driving event data through multiple passes through the one or more dropout layers to determine the embedding of the driving event data. In an aspect, uncertainty modeling component 118, e.g., in conjunction with processor 102, memory 104, etc., can obtain the multiple embeddings for the driving event data through multiple passes through the one or more dropout layers to determine the embedding of the driving event data (e.g., in the trained dataset 116). For example, MC sampling can be used based on the multiple embeddings to determine the embedding of the driving event data. As described, using the triplet loss as the regression loss can facilitate the MC sampling by determining an average of the multiple embeddings per driving event data. This can boost retrieval performance by providing a more certain association (a better embedding) for events in the dataset.

In a specific example, for person re-identification, a single network architecture with triplet loss can be used, as defined by Hermans et al. in "In defense of the triplet loss for person re-identification," in arXiv preprint arXiv:1703.07737, 2017, which is incorporated by reference herein, to train the trained dataset 116. For example, though Hermans et al. describe using Resnet-50, as defined by He et al. in "Deep residual learning for image recognition," in Proceedings of the IEEE conference on computer vision and pattern recognition, pages 770-778, 2016, another network such as DenseNet-169, described by Huang et al. in "Densely connected convolutional networks," in CVPR, volume 1, page 3, 2017, or as described by Kendall et al. in "What uncertainties do we need in Bayesian deep learning for computer vision?," in Advances in neural information processing systems, pages 5574-5584, 2017 can be used for built-in dropout layers. In an example, training component 110 can add dropout layers before each fully-connected layer in the neural network when training the dataset 116. In addition, training component 110 can normalize network embeddings to unit-circle.

In another example, uncertainty modeling component 118 can model the uncertainty using triplet loss as a regression loss based on obtaining an epistemic (or possible aleatoric) uncertainty to capture network uncertainty in terms of generalization (e.g., what training data to omit in the identification). Gal et al. describe leveraging epistemic uncertainty for model selection, i.e. hyper-parameter tuning. Kendall et al., in "Multi-task learning using uncertainty to weigh losses for scene geometry and semantics," in arXiv preprint arXiv:1705.07115, 3, 2017, which is incorporated by reference herein, describe aleatoric uncertainty to improve multi-task learning by estimating pseudo optimal weights for each tasks loss term. Using the triplet loss formulation described above, uncertainty modeling component 118 can employ MC sampling, as described above, to estimate the embedding uncertainty. Inference can be done, after training a model with dropout before every weight layer, by performing dropout at test time to sample from the approximate posterior, as suggested by Kendall et al. in "What uncertainties do we need in Bayesian deep learning for computer vision?," which can include stochastic forward passes, referred to as Monte Carlo dropout. Using multiple passes through a dropout enabled network can allow for generating multiple embeddings per sample $x_i$. These embeddings can be aggregated using the first moment into the final embedding to be used for retrieval, $emb(x_i)=\Sigma_{i=1}^{MC}\lfloor x_i\rfloor$. The second moment indicates the model uncertainty and could be used for aleatoric uncertainty study, but in one example, uncertainty modeling component 118 may not use the second moment for determining the uncertainty metric.

In training the neural network at block 206, the method 200 can optionally include, at block 212, determining a distance between the driving event data as a Euclidean distance between the embedding of the driving event data. In an aspect, training component 110, e.g., in conjunction with processor 102, memory 104, etc., can determine the distance between the driving event data as the Euclidean distance between the embedding of the driving event data. For example, in computing triplet loss for the driving event data, the Euclidean distance between the driving event data and other stored driving event data can be determined to evaluate whether the driving event data is within a threshold similarity to the stored data (e.g., for storing the driving event data as another sample for the event). In one example, using the triplet loss as a regression loss can allow for mapping the high dimensional data input of the driving events and corresponding actions to a low dimension embedding to allow the distance between the data and a subsequent query to be the Euclidean distance in the embedding feature space.

Figure 4:
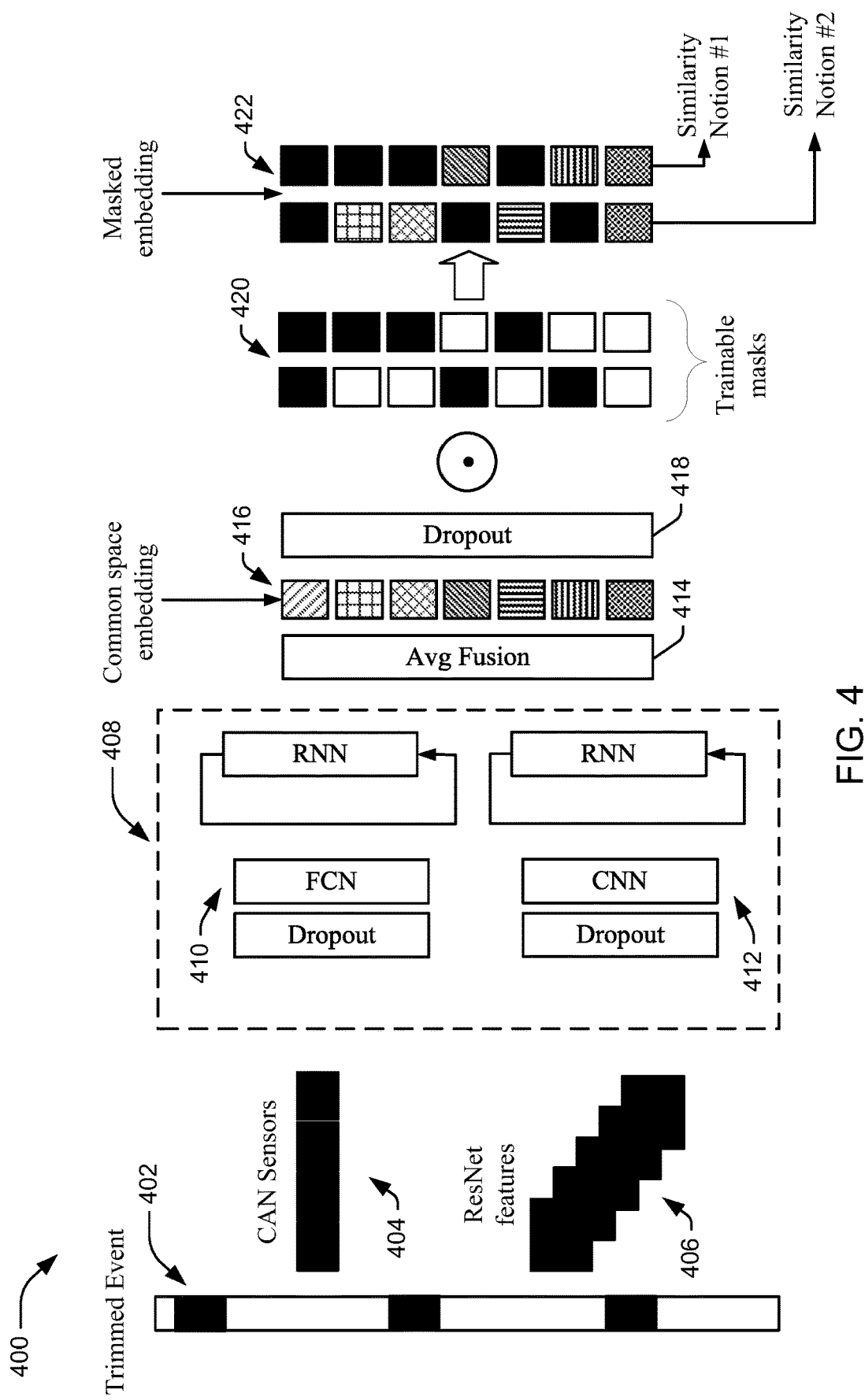
FIG. 4 illustrates an example of a process for training a neural network according to one aspect of the disclosure.

A specific example of a training process 400 using a multi-modal neural network in accordance with aspects described herein is shown in FIG. 4. In FIG. 4, given a trimmed event 402, training component 110 can draw three samples. Training component 110 can extract ResNet features 406 from the samples from video frames and can independently embed CAN sensor data 404 using separate encoders. For example, multi-modal associating component 120 can use multi-modal neural network 408 to separately encode the data by using a first recurrent neural network (RNN) 410 for CAN sensor data 404 and a second RNN 412 for ResNet features 406. For example, the first RNN 410 can be associated with a fully connected network (FCN), and the second RNN 412 can be associated with a CNN. In both networks, dropout layers can be used after each network layer (e.g., after the RNN and after the FCN/CNN). Multi-modal associating component 120 can then fuse, using average fusion 414, the encodings into a common embedding space 416, and another dropout layer 418 can be used after the embedding. Multi-modal associating component 120 can use trainable masks 420 to enable conditional retrieval for multiple similarity labels in masked embedding 422 (e.g., goal/action and event/stimulus in this example, as described) to output one or more similarity notions.

Modeling event temporal context in this regard can provide an additional and important clue for recognition. In the multi-modal network described in FIG. 4, the RNN, as described by Funahashi et al. in "Approximation of dynamical systems by continuous time recurrent neural networks," in Neural networks, 6(6):801-806, 1993, and Hochreiter et al. in "Long short-term memory," in Neural computation, 9(8):1735-1780, 1997, which are incorporated by reference herein, is employed within each modality encoder. During training, training component 110 can draw three random samples from an event, independently encode then temporally fuse using the RNN. In the case of some datasets, the random samples can include frames and sensor measurements from the camera and CAN sensor streams respectively. To reduce memory consumption, per-frame representation can be extracted from the Conv2d 7b 1×1 layer of InceptionResnet-V2, as described by Szegedy et al. in "Inception-v4, inception-resnet and the impact of residual connections on learning," in AAAI, volume 4, page 12, 2017, which is incorporated by reference herein, pretrained on ImageNet.

Figure 3:
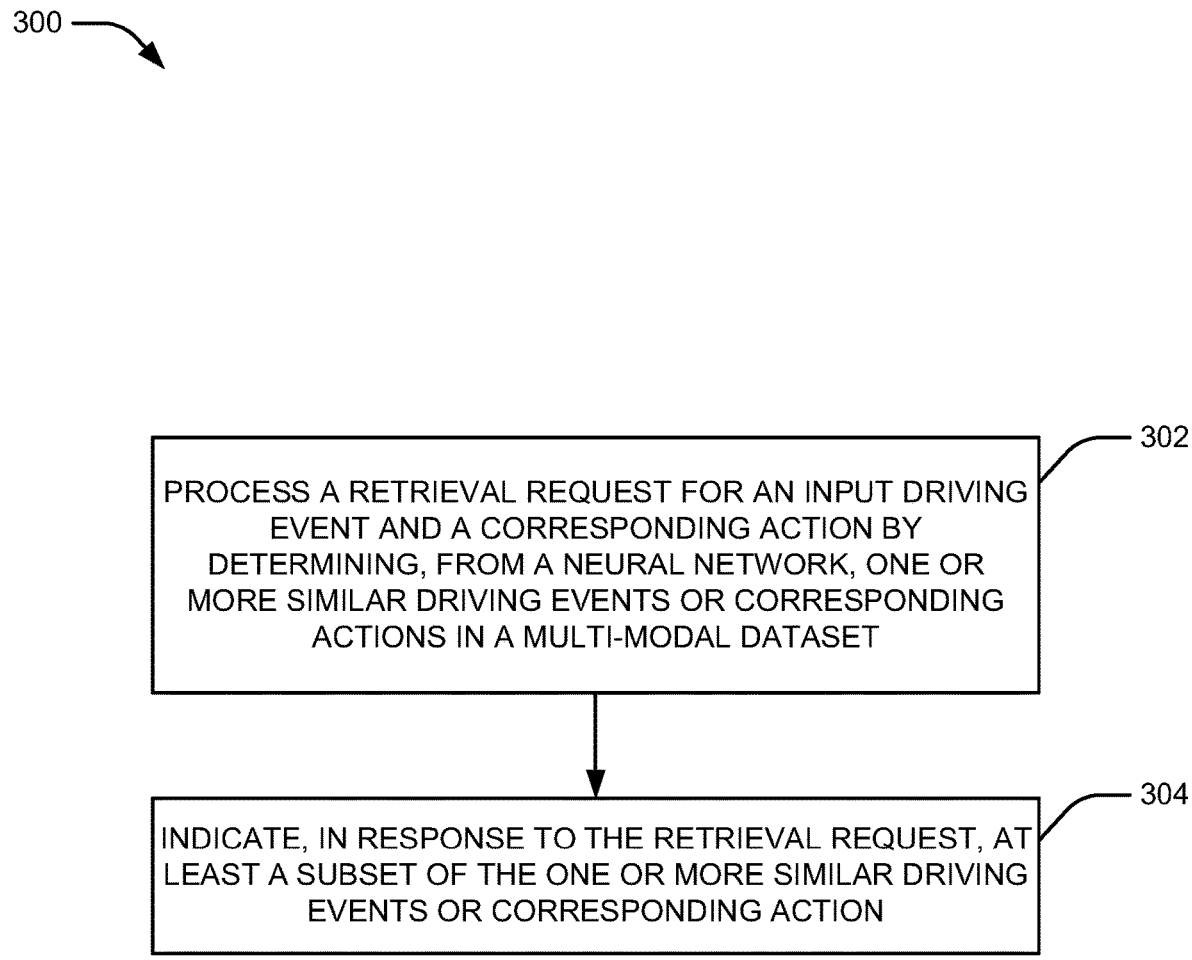
FIG. 3 illustrates a flowchart showing an example of a method for retrieving multi-modal data based on a neural network according to one aspect of the disclosure.

Referring now to FIG. 3, which is described in conjunction with the example system 100 of FIG. 1, an example method 300 for processing retrieval requests for data from a trained dataset is illustrated. For example, method 300 can be performed by one or more processors 102 and/or memories 104 of a system 100, which can be a single computing device, distributed across multiple computing devices, etc. In this regard, one or more blocks can be performed (e.g., in full or in part) on a given computing device, on a device at a remote location (e.g., such that results can be shared with the given computing device), etc.

In block 302, the method 300 can include processing a retrieval request for an input driving event and a corresponding action by determining, from a neural network, one or more similar driving events or corresponding actions in a multi-modal dataset. In an aspect, retrieval component 108, e.g., in conjunction with processor 102, memory 104, etc., can process the retrieval request for the input driving event and the corresponding action by determining, from the neural network, the one or more similar driving events or corresponding actions in the multi-modal dataset. In one example, training component 110 can train the neural network based on the multi-modal dataset, as described above in method 200.

As described, the multi-modal data can be temporally fused as events and corresponding actions into a common space by averaging. In an aspect, multi-modal associating component 120, e.g., in conjunction with processor 102, memory 104, etc., can temporally fuse the event and action data so that the event data, which can be represented by an image or sequence of multiple images, as described, can be associated with the action, which can assist in verifying an action for a similar event when querying the multi-modal data. In one example, in processing the retrieval request, retrieval component 108 can search the neural network for events that have a Euclidean distance between the event and the input event that is within a threshold, which can represent events that are most similar to the input event. In addition, the actions associated with the determined events can be analyzed to determine whether the action corresponding to the input driving event is the expected action.

In block 304, the method 300 can include indicating, in response to the retrieval request, at least a subset of the one or more similar driving events or corresponding action. In an aspect, retrieval component 108, e.g., in conjunction with processor 102, memory 104, etc., can indicate, in response to the retrieval request, at least the subset of the one or more driving events or corresponding action. In one example, retrieval component 108 can indicate the action associated with events determined, from the neural network (e.g., as having a Euclidean distance to the input driving event that is with a threshold) to be similar to the input driving event. The action associated with the input driving event can be verified in this regard.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 500 is shown in FIG. 5.

Figure 5:
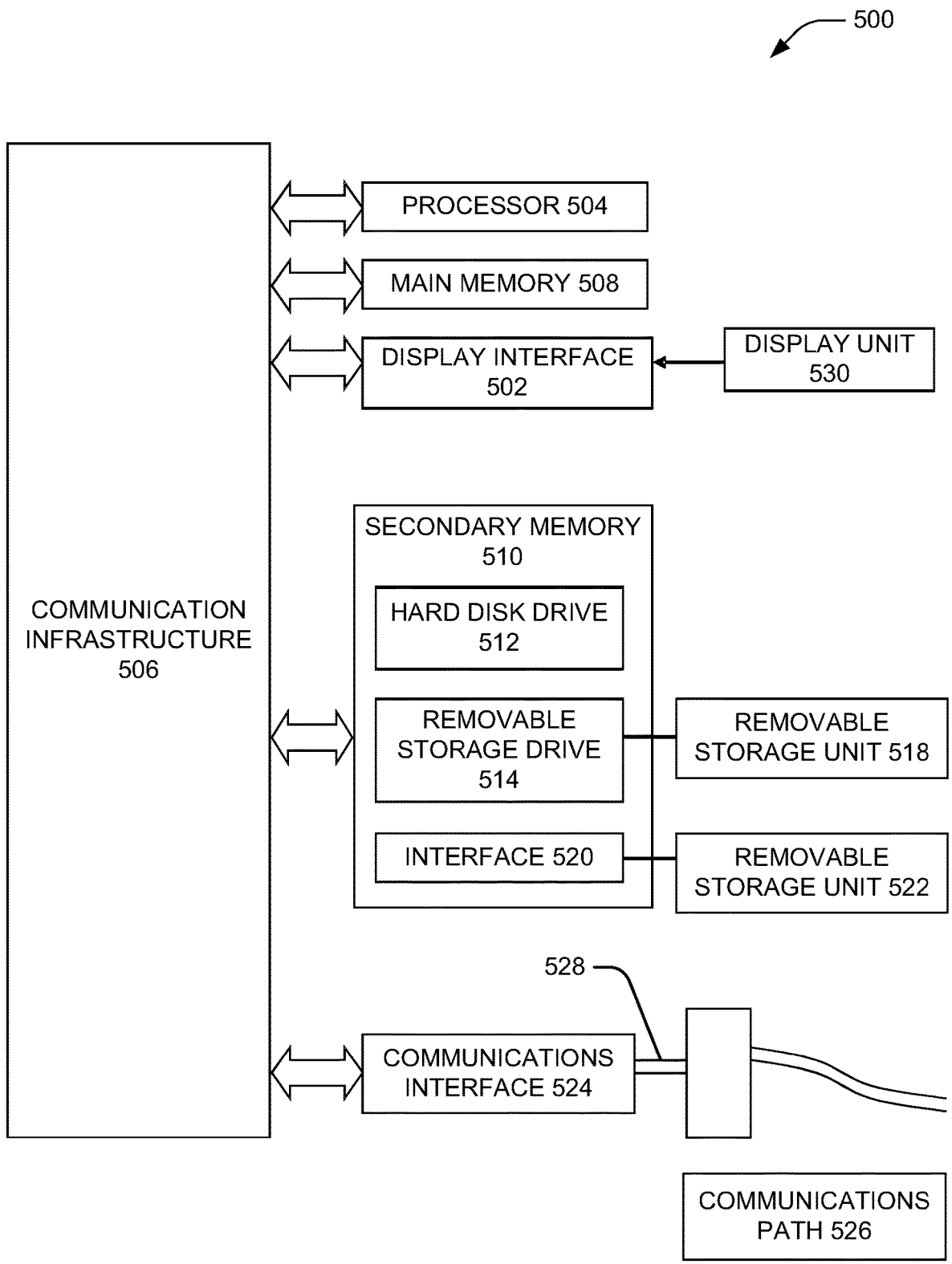
FIG. 5 presents an example system diagram of various hardware components and other features according to one aspect of the disclosure.

FIG. 5 presents an example system diagram of various hardware components and other features, for use in accordance with an aspect of the present disclosure. Computer system 500 includes one or more processors, such as processor 504. The processor 504 is connected to a communication infrastructure 506 (e.g., a communications bus, crossover bar, or network). In one example, processor 102 can include processor 504. Various software aspects are described in terms of this example computer system. After reading this description, it will become apparent to a person skilled in the relevant art(s) how to implement aspects described herein using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 can include other similar devices for allowing computer programs or other instructions to be loaded into computer system 500. Such devices can include, for example, a removable storage unit 522 and an interface 520. Examples of such can include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500. In an example, memory 104 can include one or more of main memory 508, secondary memory 510, removable storage drive 514, removable storage unit 518, removable storage unit 522, etc.

Computer system 500 can also include a communications interface 524. Communications interface 524 allows software and data to be transferred between computer system 500 and external devices. Examples of communications interface 524 can include a modem, a network interface (such as an Ethernet card), a communications port, a Personal Computer Memory Card International Association (PCMCIA) slot and card, etc. Software and data transferred via communications interface 524 are in the form of signals 528, which can be electronic, electromagnetic, optical or other signals capable of being received by communications interface 524. These signals 528 are provided to communications interface 524 via a communications path (e.g., channel) 526. This path 526 carries signals 528 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects described herein can be directed to such computer program products.

Computer programs (also referred to as computer control logic) are stored in main memory 508 and/or secondary memory 510. Computer programs can also be received via communications interface 524. Such computer programs, when executed, enable the computer system 500 to perform various features in accordance with aspects described herein. In particular, the computer programs, when executed, enable the processor 504 to perform such features. Accordingly, such computer programs represent controllers of the computer system 500. Computer programs can include image component 106, retrieval component 108, training component 110 or its subcomponents, vehicle control component 112, etc., as described herein.

In variations where aspects described herein are implemented using software, the software can be stored in a computer program product and loaded into computer system 500 using removable storage drive 514, hard disk drive 512, or communications interface 520. The control logic (software), when executed by the processor 504, causes the processor 504 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 6:
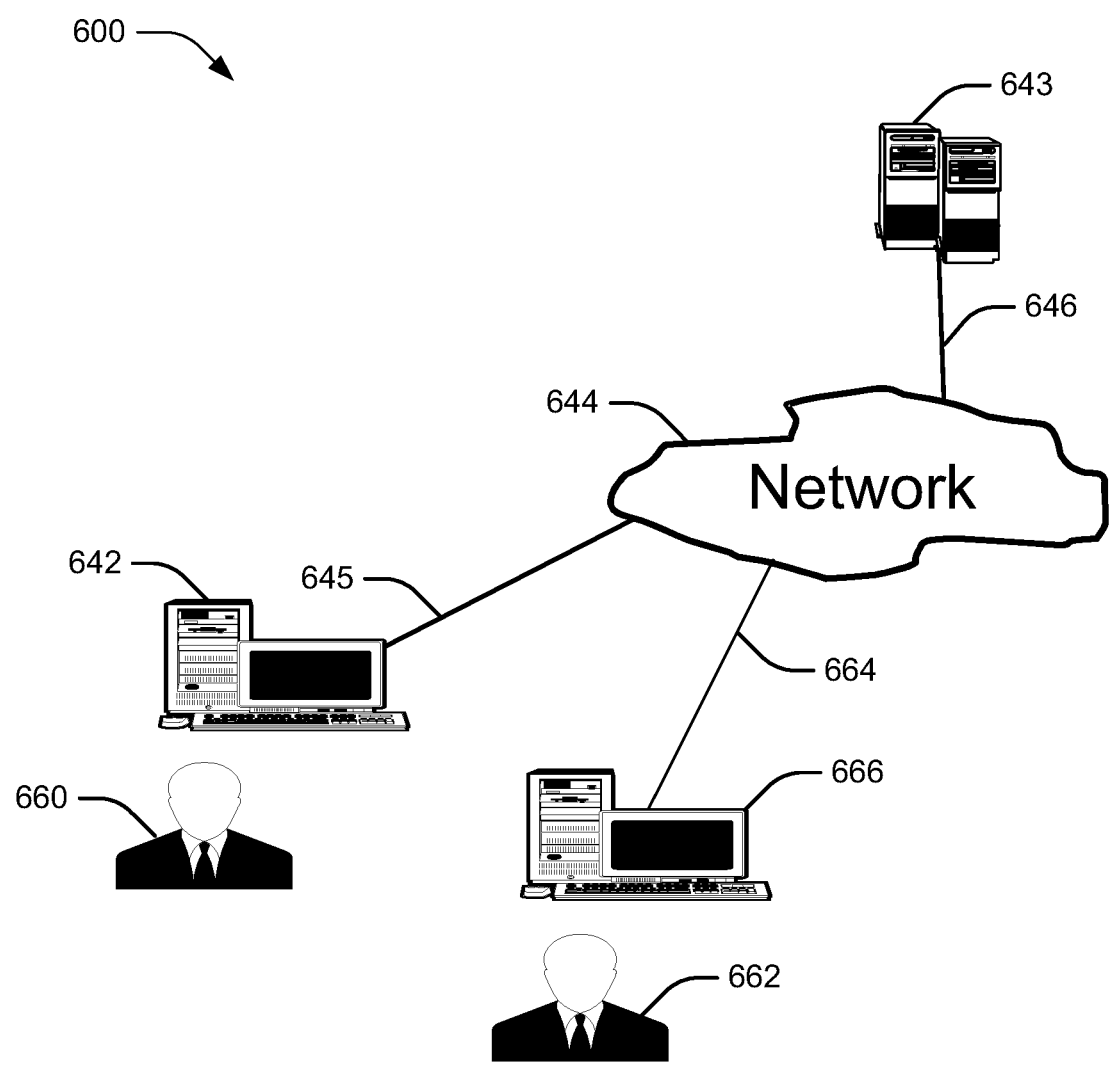
FIG. 6 is a block diagram of various example system components according to one aspect of the disclosure.

FIG. 6 is a block diagram of various example system components, in accordance with an aspect. FIG. 6 shows a communication system 600 usable in accordance with aspects described herein. The communication system 600 includes one or more accessors 660, 662 (also referred to interchangeably herein as one or more "users") and one or more terminals 642, 666. For example, terminals 642, 666 can be computing devices that can include a processor (e.g., processor 102), memory (e.g., memory 104). In one aspect, data for use in accordance with aspects described herein is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for performing retrieval operations in neural networks, comprising:
obtaining multi-modal data representing driving events and corresponding actions related to the driving events;
training a neural network based on the multi-modal data at least in part by using a triplet loss computed for the driving events as a regression loss to determine an embedding of driving event data;
processing a retrieval request for an input driving event and corresponding action by determining, from the neural network, one or more similar driving events or corresponding actions in the multi-modal data; and
indicating, in response to the retrieval request, at least a subset of the one or more similar driving events or corresponding actions.

2. The method of claim 1, wherein training the neural network comprises adding one or more dropout layers after one or more convolutional layers of the neural network to drop one or more connections between the driving event data.

3. The method of claim 1, wherein training the neural network comprises determining a distance between the driving event data as a Euclidean distance between the embedding of the driving event data.

4. The method of claim 1, wherein the multi-modal data representing driving events is retrieved from an image sensor positioned on a vehicle and wherein the multi-modal data representing the corresponding actions related to the driving events is retrieved from one or more controller area network (CAN) sensors in a vehicle.

5. The method of claim 1, wherein training the neural network comprises temporally associating the driving events and corresponding actions related to the driving events.

6. The method of claim 2, further comprising obtaining multiple embeddings for the driving event data through multiple passes through the one or more dropout layers to determine the embedding of the driving event data.

7. The method of claim 2, wherein the one or more dropout layers include dropout as a Bayesian approximation.

8. A computing device for performing retrieval operations in neural networks, comprising:
a memory; and
at least one processor coupled to the memory, wherein the at least one processor is configured to:
obtain multi-modal data representing driving events and corresponding actions related to the driving events;
train a neural network based on the multi-modal data at least in part by using a triplet loss computed for the driving events as a regression loss to determine an embedding of driving event data;
process a retrieval request for an input driving event and corresponding action by determining, from the neural network, one or more similar driving events or corresponding actions in the multi-modal data; and
indicate, in response to the retrieval request, at least a subset of the one or more similar driving events or corresponding actions.

9. The computing device of claim 8, wherein the at least one processor is configured to train the neural network at least in part by adding one or more dropout layers after one or more convolutional layers of the neural network to drop one or more connections between the driving event data.

10. The computing device of claim 8, wherein the at least one processor is configured to train the neural network at least in part by determining a distance between the driving event data as a Euclidean distance between the embedding of the driving event data.

11. The computing device of claim 8, wherein the multi-modal data representing driving events is retrieved from an image sensor positioned on a vehicle and wherein the multi-modal data representing the corresponding actions related to the driving events is retrieved from one or more controller area network (CAN) sensors in a vehicle.

12. The computing device of claim 8, wherein the at least one processor is configured to train the neural network at least in part by temporally associating the driving events and corresponding actions related to the driving events.

13. The computing device of claim 9, wherein the at least one processor is further configured to obtain multiple embeddings for the driving event data through multiple passes through the one or more dropout layers to determine the embedding of the driving event data.

14. The computing device of claim 9, wherein the one or more dropout layers include dropout as a Bayesian approximation.

15. A non-transitory computer-readable medium storing computer executable code for performing retrieval operations in neural networks, the code comprising code for:
obtaining multi-modal data representing driving events and corresponding actions related to the driving events;
training a neural network based on the multi-modal data at least in part by using a triplet loss computed for the driving events as a regression loss to determine an embedding of driving event data;
processing a retrieval request for an input driving event and corresponding action by determining, from the neural network, one or more similar driving events or corresponding actions in the multi-modal data; and
indicating, in response to the retrieval request, at least a subset of the one or more similar driving events or corresponding actions.

16. The non-transitory computer-readable medium of claim 15, wherein the code for training the neural network adds one or more dropout layers after one or more convolutional layers of the neural network to drop one or more connections between the driving event data.

17. The non-transitory computer-readable medium of claim 15, wherein the code for training the neural network determines a distance between the driving event data as a Euclidean distance between the embedding of the driving event data.

18. The non-transitory computer-readable medium of claim 15, wherein the multi-modal data representing driving events is retrieved from an image sensor positioned on a vehicle and wherein the multi-modal data representing the corresponding actions related to the driving events is retrieved from one or more controller area network (CAN) sensors in a vehicle.

19. The non-transitory computer-readable medium of claim 16, further comprising code for obtaining multiple embeddings for the driving event data through multiple passes through the one or more dropout layers to determine the embedding of the driving event data.

20. The non-transitory computer-readable medium of claim 16, wherein the one or more dropout layers include dropout as a Bayesian approximation.

* * * * *